United States Patent Office 3,455,884
Patented July 15, 1969

3,455,884
FILMS, FOILS, AND FIBERS ON A BASIS OF POLYHYDROXYMETHYLENES
Heinz Ratz and Hans Schübel, Troisdorf, Germany, assignors to Dynamit Nobel Aktiengesellschaft, Troisdorf, Bezirk Cologne, Germany
No Drawing. Filed Feb. 1, 1966, Ser. No. 523,859
Claims priority, application Germany, Feb. 3, 1965, D 46,427
Int. Cl. C08f 5/00, 27/08
U.S. Cl. 260—77.5        9 Claims

ABSTRACT OF THE DISCLOSURE

Process for preparing films, foils and fibers on the basis of polyhydroxymethylene comprising the steps of (1) reacting polyvinylene carbonate with an amine having at least one hydrogen atom bonded to the nitrogen atom to form a water-soluble polyhydroxyurethane having the formula:

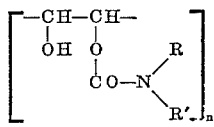

wherein R is an aliphatic, cycloaliphatic, aromatic or heterocyclic radical, R' is hydrogen or an aliphatic, cycloaliphatic, aromatic or heterocyclic radical, which radicals can contain hydrophilic groups such as —OH, —SH and —COOH groups, $n$ has a value of =100, (2) forming a film, foil or fiber from an aqueous solution of the thusly formed polyhydroxy urethane, and (3) saponifying the polyhydroxyurethane film, foil or fiber by means of an alkaline agent.

---

This invention relates to the production of films, foils, and fibers on a basis of polyhydroxymethylenes.

It is known that films, foils, and filaments can be produced from solutions of polyvinylene carbonate, which films, foils, and filaments can then be converted by alkaline saponification to polyhydroxymethylenes without loss of shape or alteration of their appearance. Polyhydroxymethylene formed products—i.e., films, foils, and filaments—differ from those made on the basis of polyvinylene carbonates principally in their great chemical inertness.

The solvent for polyvinylene carbonates characterized by large molecular weights which constitute the only important one for use in the manufacture of formed products from polyvinylene carbonates are dimethyl formamide, dimethyl acetamide, dimethyl sulfoxide, γ-butyrolactone and ethylene carbonate. However, for practical reasons the only one of these solvents that is used for preparing solutions of the polymers is dimethyl formamide, because of its relatively favorable boiling point. The polyvinylene carbonate is accordingly dissolved in dimethyl formamide under application of heat, several hours being required for complete dissolution depending on the temperature used. The solution which is obtained is cast into foils and films, or spun by dry spinning processed into filaments, which are then saponified with alkaline substances. A serious disadvantage of the aforesaid process, however, is that, when the polyvinylene carbonate is dissolved in the dimethyl formamide using heat, degradation and decomposition of the polymers takes place to a more or less considerable extent, depending on the temperature used. This degradation and decomposition have an unfavorable effect on the quality and properties of the products thus produced. Thus, for example, the materials produced are dark-colored, and exhibit reduced molecular weight, increased brittleness, and reduced strength.

Accordingly, the prior art methods rely for producing products which are approximately free of degradation and decomposition products on the use of low temperatures, and hence long periods are required for dissolving polyvinylene carbonate materials. Further, the films, foils, and fibers manufactured from solutions of polyvinylene carbonate in dimethyl formamide must be dried before they are saponified to the polyhydroxymethylene form. This presents a serious problem on account of the low volatility of dimethyl formamide. Furthermore, the use of dimethyl formamide as a solvent has the considerable disadvantage that its use is not economical because of its relatively high cost.

It is an object present invention to provide a new and improved process for the preparation of films, foils, and filaments on the basis of polyhydroxymethylene.

It is another object of this invention to provide a process for the preparation of films, foils, and filaments on the basis of polyhydroxymethylene which avoids the necessity of using high temperatures.

It is a further object of this invention to provide a process for the preparation of films, foils, and filaments on the basis of polyhydroxymethylene which results in the foils, films, and filaments of highly satisfactory quality and properties.

It is a further object of this invention to provide a process for the preparation of films, foils, and filaments on the basis of polyhydroxymethylene which is not limited to the use of dimethyl formamide as solvent.

Other objects will become apparent during the following discussion.

It has now been found that the aforesaid objects are attained and polyhydroxymethylene products in the form of films, foils, and filaments are obtained by reacting polyvinylene carbonate in a first stage with an amine, having at least one hydrogen atom bonded to the nitrogen, to form a water-soluble polyhydroxyurethane having the following formula:

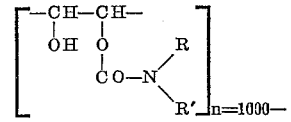

wherein R is an aliphatic, cycloaliphatic, aromatic or heterocyclic radical, R' hydrogen and a radical as described for R, and the radical may contain hydrophilic groups, such as —OH, —SH and —COOH groups; thereafter forming films, foils, coatings or filaments from a solution of the thusly formed polyhydroxy urethane and saponifying the thusly formed product, using therefor a basic reacting substance. Thus the applicants have found that the disadvantages of the art can be avoided and that the products with improved properties can be prepared if the saponification of polyvinylene carbonate is carried out in two stages and specifically as just described.

The reaction of the polyvinylene carbonate with the amine takes place easily and is conducted with intensive agitation at temperatures of about 10° to about 30° C.; a solution of the polyhydroxyurethane in the amine being obtained in a short time. Precipitation is brought about by pouring the viscous solution produced in the reaction into methanol, acetone or the like. The precipitate is washed until no further amine adheres to it, and the reaction product is isolated as a colorless, fibrous mass which is very readily soluble in cold water.

As amines, having at least one hydrogen atom bonded to the nitrogen, primary and secondary aliphatic, cycloaliphatic, aromatic or heterocyclic amines may be used for the reaction with the polyvinylene carbonate. Especially these are suitable which have hydrophilic groups in addition, such as —OH, —SH and —COOH groups, as well as oxygen-containing rings, such as, for example, aminoalkanols and amino acids, etc. Suitable compounds are methanol amine, ethanol amine, morpholine, diethanol amine, furfurylamine, isopropanol amine, propylamine, butylamine, and the like.

From aqueous solutions of the polyhydroxyurethanes thus recovered it is now possible to prepare films, foils, coatings or filaments by the conventional methods described in the prior art, and thereafter saponify these products using basic agents to form the corresponding polyhydroxymethylene products without loss of shape.

As basic agents there are suitable the hydroxides and alcoholates of the alkali or alkaline earth metals, ammonia, and organic bases such as ethanolamine, aliphatic amines or the like, which are used advantageously in alcoholic solution as, for example, in methanol.

The saponification is carried out at temperatures of about 10° to about 50° C. with no observable degradation of the polymers.

The polyhydroxymethylene formed products manufactured by the process of the invention are colorless and substantially less brittle than those obtained by the methods of the prior art.

The stepwise saponification to polyhydroxymethylenes via the polyhydroxyurethanes can be carried out using as starting materials polyvinylene carbonates of various viscosities. Copolymers which contain predominantly vinylene carbonate groups, that is at least 50 mol percent vinylene carbonate, can also be saponified to polymers having hydroxymethylene units by the method of the present invention. Such copolymers of vinylene carbonate are exemplified by those having, for example, the following co-monomers: acrylonitrile, acrylamide, acrylates, methacrylates, olefins such as ethylene, propylene butadiene, styrene or substituted styrenes like dimethyl styrene, vinyl ethers, vinylidene chloride, vinyl esters such as vinyl acetate or vinyl propionate, or vinyl chloride.

In order to obtain water-soluble and hence easily workable intermediates, it is not always necessary that all of the carbonate groups contained in the polyvinylene carbonate or its copolymers react with the amine. For example, a reaction of about 50% of the carbonate groups of the vinylene carbonate homopolymer with ethanolamine results in the production of polyhydroxy urethanes, characterized by good water solubility. A partial reaction of this kind is achieved, for example, if a solution of the amine in, for example, methanol, ethanol, or the like, is allowed to react with the polyvinylene carbonates or copolymers thereof having a predominant content of vinylene carbonate groups, whereupon a colorless, voluminous mass develops which is insoluble in the organic phase, and which can be processed to polyhydroxymethylene products from aqueous solutions in the manner described above.

The amine introduced into the reaction and not utilized therein can be recovered almost completely by fractionating the precipitation and saponification baths.

Although it is believed that the practice will be clear to one skilled in the art from the foregoing discussion, the following simplified examples are offered as further illustration:

Example 1

A large excess of freshly distilled ethanolamine (about 500 to 600 g.) was added to 30 g. polyvinylene carbonate of a relative viscosity of 2.8 at temperatures of about 10° to about 30° C., and the resulting mixture intensely agitated.

After about 5 minutes the polyvinylene carbonate had reacted and a colorless, viscous solution was formed. This solution was stirred into methanol or acetone, whereupon the polyhydroxyurethane which formed was precipitated as a colorless, fibrous mass. The precipitate was recovered and washed twice with 250 cc. of acetone, to produce an ethanolamine free product. Without previous drying, the polyhydroxyurethane thus obtained was readily soluble in cold water, so that solutions of various concentrations could be prepared therefrom, depending on the intended application.

For the manufacture of foils, for example, an aqueous solution of about 10 to 20% by weight of said polyhydroxy urethane was prepared and poured onto siliconized glass plates or onto polyethylene plates. After about 12 hours, the foil could be lifted off and thereafter saponified. For this purpose the foil was introduced into a solution of 1 to 2% by weight of sodium methylate in methanol, and the resulting mixture heated to about 40° C. After 10 to 12 hours the reaction was completed and a clear foil of polyhydroxymethylene obtained. The nature of the foil was established by analysis and infra-red spectroscopy.

Further processing of the precipitation and saponification baths by the conventionally practiced methods resulted in the recovery of the ethanolamine used in the reaction.

Example 2

30 g. of polyvinylene carbonate having a relative viscosity of 2.0 were thoroughly mixed with a 15 to 20 times excess of the theoretically necessary amount of freshly distilled morpholine at temperatures of about 10° to about 30° C. until, after about 20 to 30 minutes, a colorless, viscous solution had developed. When this solution was poured into acetone, a colorless, fibrous mass precipitated out. The precipitate was washed twice using 250 cc. of acetone for each washing. Without first drying the precipitate, the polyhydroxyurethane thus obtained was dissolved in cold water, and the solution thus obtained then poured onto appropriate plates. After about 12 hours, the foil which formed could be lifted off from the plates and was saponified to polyhydroxymethylene foil at about 40° C., in a solution of 1 to 2% by weight of sodium methylate in methanol.

The saponification to polyhydroxymethylene was confirmed by infra-red spectroscopy and analysis of the foil material. The morpholine that was used could be recovered from the baths in the conventional manner.

Example 3

10 g. polyvinylene carbonate having a relative viscosity of 2.5 were reacted at a temperature of about 10° to about 30° C. with excess diethanolamine (about 10 times the theoretically necessary amount), whereupon a clear, viscous solution was obtained. The reaction product was precipitated out by pouring the solution which was thusly obtained into methanol. A colorless mass was thereby obtained, which was washed with further quantities of methanol. The polyhydroxyurethane which resulted was dissolved in water and the resulting solution then processed as described above into a foil. The foil obtained was saponified to a polyhydroxymethylene foil by permitting the polyhydroxyurethane foil to remain for about 12 hours at about 40° C. in a solution of about 1 to 2 wt. percent of sodium hydroxide in methanol.

The saponification to form polyhydroxymethylene was established by analysis and infra-red spectroscopy.

The diethanolamine that was used was recovered by further processing of the baths.

Example 4

10 g. of a coploymer comprising 80 mol percent vinylene carbonate units and 20 mol percent vinyl acetate units were reacted with about 10 to 15 times the theoretically necessary amount of ethanolamine at a temperature of about 10° to about 30° C. A clear, viscous solution was formed from which a colorless precipitate was obtained by pouring the solution into an excess of acetone. The thusly obtained precipitate was washed free of amine using further quantities of acetone, and thereafter dissolved in cold water. The aqueous solution which resulted was then converted, as described in the preceding examples, into a polyhydroxyurethane foil. The polyhydroxyurethane foil was converted by about 10 to 12 hours of saponification using therefor a solution of 1 wt. percent of caustic potash in methanol at about 40° C. into a foil consisting mainly of polyhydroxymethylene units.

Analysis and infra-red spectroscopy established the saponification of the foil material to a polymer containing predominantly polyhydroxymethylene units.

Example 5

A polyhydroxyurethane was produced from a polyvinylene carbonate having a relative viscosity of 2.95 with ethanolamine in the manner described in the foregoing examples. A solution of this polyhydroxyurethane in water was processed into a foil. This foil was saponified by about 12 hours of standing in a 10 wt. percent solution of ethanolamine in methanol at about 40° C., forming a polyhydroxymethylene foil.

The completeness of the saponification was checked by analysis and infra-red spectroscopy.

Example 6

An aqueous solution of polyhydroxyurethane was prepared in the manner described above from polyvinylene carbonate having a relative viscosity of 2.95. This solution was spun into a 2 wt. percent methanolic solution of sodium methylate which had been heated to about 50° C. After a standing time of about 6 to 8 hours, a filament of polyhydroxymethylene was obtained. This was confirmed by analysis and infra-red spectroscopy.

Example 7

17.2 g. polyvinylene carbonate (0.02 mol) was thoroughly mixed using strong agitation at temperatures of about 10° to about 30° C. with a solution of 7 g. ethanolamine (0.115 mol) in 200 cc. methanol agitation. After about 2 to 3 hours, the completion of the reaction was apparent by the changed appearance of the material. The kernels of polyvinylene carbonate appeared voluminous and swollen. The material was isolated by filtration, washed free of amine with methanol or acetone, and dissolved in cold water. The aqueous solution which was thereby obtained was processed as in the preceding examples either into a foil which was converted with alcoholic alkalis or the like into a polyhydroxymethylene foil, or it was spun into a heated alcoholic alkali solution, filaments of polyhydroxymethylene being obtained after a standing time of about 8 hours.

From the nitrogen value found in the analysis of the intermediate product, 49.2% of the carbonate groups present in the polyvinylene carbonate had been converted to hydroxyurethane groups. The infrared spectrum of this material also showed, one adjacent the other, the bands of the carbonate, urethane and hydroxyl groups.

The analysis and infra-red spectrum of the material which were recovered after saponification were identical to those of polyhydroxymethylene.

We claim:
1. A process for the preparation of films, foils and filaments comprising the steps of:
(A) forming a polymer by reacting at a temperature of from 10° C. to 30° C.
(i) a polymer selected from the group consisting of (1) polyvinylene carbonate and (2) copolymers of vinylene carbonate with an unsaturated monomer selected from the group consisting of acrylonitrile, acrylamide, an acrylate, a methacrylate, ethylene, propylene, butadiene, styrene, dimethyl styrene, a vinyl ether, vinylidene chloride, vinyl chloride, vinyl acetate, and vinyl propionate, wherein said copolymer comprises at least 50 mole percent vinylene carbonate, and
(ii) a molar excess of an amine selected from the group consisting of methanol amine, ethanol amine, morpholine, diethanol amine, furfurylamine, isopropanol amine, propylamine and butylamine;
(B) separating the polymer from the excess amine;
(C) dissolving the polymer in water;
(D) forming a film, foil, or filament from said aqueous solution of polymer; and
(E) saponifying the thus formed film, foil or filament by treating same with a basic saponifying agent at a temperature between about 10° C. and 50° C.

2. Process according to claim 1, wherein said amine is a member selected from the group consisting of methanol amine, ethanol amine, isopropanol amine, and diethanol amine.

3. Process according to claim 1, wherein said amine is ethanolamine.

4. Process according to claim 1, wherein said amine is morpholine.

5. Process according to claim 1, wherein said basic saponifying agent is a member selected from the group consisting of alkali metal and alkaline earth metal hydroxides and alcoholates, amonia and amines.

6. Process according to claim 5, which comprises utilizing said basic saponifying agent in the form of an alcoholic solution thereof.

7. Process according to claim 1, wherein said polyvinylene carbonate copolymer is a copolymer of vinylene carbonate and vinyl acetate.

8. Process according to claim 1, wherein step (B) comprises the step of precipitating said polyhydroxy urethane from its solution in said amine by contacting the same with a member selected from the group consisting of methanol and acetone.

9. Process according to claim 1, which comprises effecting said reaction of polyvinylene carbonate or copolymer of vinylene carbonate and amine so that about 50% of the carbonate groups are reacted.

References Cited

UNITED STATES PATENTS

| 2,794,013 | 5/1957  | Drechsel         | 260—77.5  |
| 2,847,401 | 8/1958  | Gluesenkamp et al. | 260—77.5 |
| 2,847,402 | 8/1958  | Gluesenkamp et al. | 260—77.5 |
| 2,918,478 | 12/1959 | Newman           | 260—340.2 |
| 2,930,779 | 3/1960  | Drechsel         | 260—72    |
| 3,021,340 | 2/1962  | Anderson         | 260—340.2 |
| 3,069,391 | 12/1962 | Schaefgen        | 260—77.5  |
| 3,344,102 | 9/1967  | Huffman          | 260—29.6  |

DONALD E. CZAJA, Primary Examiner

M. J. WELSH, Assistant Examiner

U.S. Cl. X.R.

117—124, 138.8